United States Patent [19]

Koyama

[11] Patent Number: 5,940,058
[45] Date of Patent: Aug. 17, 1999

[54] CLAMP AND GAMMA CORRECTION CIRCUIT, AND IMAGE DISPLAY APPARATUS AND ELECTRONIC MACHINE EMPLOYING THE SAME

[75] Inventor: Fumio Koyama, Suwa, Japan

[73] Assignee: Seiko Epson Corporation, Tokyo, Japan

[21] Appl. No.: 08/965,683

[22] Filed: Nov. 6, 1997

[30] Foreign Application Priority Data

Nov. 8, 1996 [JP] Japan ..................................... 8-313107

[51] Int. Cl.⁶ ............................. G09G 3/36; H04N 5/202
[52] U.S. Cl. ............................. 345/89; 348/677; 348/691
[58] Field of Search .................................. 348/674, 254, 348/675–679, 691, 692, 751, 761, 766, 790, 89–99; 345/207–214; H04N 5/202

[56] References Cited

U.S. PATENT DOCUMENTS 5,751,267  5/1998  Sato et al. .................................. 345/96
5,754,150  5/1998  Matsui ....................................... 345/89

*Primary Examiner*—Victor R. Kostak
*Attorney, Agent, or Firm*—Oliff & Berridge, PLC

[57] ABSTRACT

A clamp and gamma correction circuit which processes an image signal through a clamp circuit and then a gamma correction circuit in that order to perform a proper gamma correction with a clamp voltage adjusted to its appropriate value. An image signal varying between a black level and a white level is applied to the clamp circuit. The clamp circuit outputs an image signal, the black level of which is clamped to the clamp voltage, while the amplitude between the black level and the white level is maintained at constant level. The gamma correction circuit amplifies the image signal output by the clamp circuit at different amplification factors based on a reference voltage. A voltage setting circuit varies the clamp voltage and the reference voltage but with the voltage difference therebetween kept constant, and applies the clamp voltage and the reference voltage to the clamp circuit and the gamma correction circuit, respectively.

11 Claims, 21 Drawing Sheets

FRAME 1

| V1+ | V2− | V3+ | V4− | V5+ | V6− | V1+ | V2− | . . . | V1+ | V2− |
|---|---|---|---|---|---|---|---|---|---|---|
| V2− | V3+ | V4− | V5+ | V6− | V1+ | V2− | V3+ | | V2− | V3+ |
| V3+ | V4− | V5+ | V6− | V1+ | V2− | V3+ | V4− | | V3+ | V4− |
| V4− | V5+ | V6− | V1+ | V2− | V3+ | V4− | V5+ | | V4− | V5+ |
| ⋮ | | | | | | | | | | |
| V6− | V1+ | V2− | V3+ | V4− | V5+ | V6− | V1+ | | V6− | V1+ |

FRAME 2

| V1− | V2+ | V3− | V4+ | V5− | V6+ | V1− | V2+ | . . . | V1− | V2+ |
|---|---|---|---|---|---|---|---|---|---|---|
| V2+ | V3− | V4+ | V5− | V6+ | V1− | V2+ | V3− | | V2+ | V3− |
| V3− | V4+ | V5− | V6+ | V1− | V2+ | V3− | V4+ | | V3− | V4+ |
| V4+ | V5− | V6+ | V1− | V2+ | V3− | V4+ | V5− | | V4+ | V5− |
| ⋮ | | | | | | | | | | |
| V6+ | V1− | V2+ | V3− | V4+ | V5− | V6+ | V1− | | V6+ | V1− |

FIG.11

FRAME 1

| V1+ | V2+ | V3+ | V4+ | V5+ | V6+ | V1+ | V2+ | ... | V1+ | V2+ |
|-----|-----|-----|-----|-----|-----|-----|-----|-----|-----|-----|
| V2− | V3− | V4− | V5− | V6− | V1− | V2− | V3− |     | V2− | V3− |
| V3+ | V4+ | V5+ | V6+ | V1+ | V2+ | V3+ | V4+ |     | V3+ | V4+ |
| V4− | V5− | V6− | V1− | V2− | V3− | V4− | V5− |     | V4− | V5− |
| ⋮   |     |     |     |     |     |     |     |     |     |     |
| V6− | V1− | V2− | V3− | V4− | V5− | V6− | V1− |     | V6− | V1− |

FRAME 2

| V1− | V2− | V3− | V4− | V5− | V6− | V1− | V2− | ... | V1− | V2− |
|-----|-----|-----|-----|-----|-----|-----|-----|-----|-----|-----|
| V2+ | V3+ | V4+ | V5+ | V6+ | V1+ | V2+ | V3+ |     | V2+ | V3+ |
| V3− | V4− | V5− | V6− | V1− | V2− | V3− | V4− |     | V3− | V4− |
| V4+ | V5+ | V6+ | V1+ | V2+ | V3+ | V4+ | V5+ |     | V4+ | V5+ |
| ⋮   |     |     |     |     |     |     |     |     |     |     |
| V6+ | V1+ | V2+ | V3+ | V4+ | V5+ | V6+ | V1+ |     | V6+ | V1+ |

FIG. 12

FRAME 1

| V1+ | V2+ | V3+ | V4+ | V5+ | V6+ | V1+ | V2+ | ... | V1+ | V2+ |
|-----|-----|-----|-----|-----|-----|-----|-----|-----|-----|-----|
| V2+ | V3+ | V4+ | V5+ | V6+ | V1+ | V2+ | V3+ |     | V2+ | V3+ |
| V3+ | V4+ | V5+ | V6+ | V1+ | V2+ | V3+ | V4+ |     | V3+ | V4+ |
| V4+ | V5+ | V6+ | V1+ | V2+ | V3+ | V4+ | V5+ |     | V4+ | V5+ |
| ⋮   |     |     |     |     |     |     |     |     |     |     |
| V6+ | V1+ | V2+ | V3+ | V4+ | V5+ | V6+ | V1+ |     | V6+ | V1+ |

FRAME 2

| V1− | V2− | V3− | V4− | V5− | V6− | V1− | V2− | ... | V1− | V2− |
|-----|-----|-----|-----|-----|-----|-----|-----|-----|-----|-----|
| V2− | V3− | V4− | V5− | V6− | V1− | V2− | V3− |     | V2− | V3− |
| V3− | V4− | V5− | V6− | V1− | V2− | V3− | V4− |     | V3− | V4− |
| V4− | V5− | V6− | V1− | V2− | V3− | V4− | V5− |     | V4− | V5− |
| ⋮   |     |     |     |     |     |     |     |     |     |     |
| V6− | V1− | V2− | V3− | V4− | V5− | V6− | V1− |     | V6− | V1− |

FIG.13

FRAME 1

| V1+ | V2− | V3+ | V4− | V5+ | V6− | V1+ | V2− | ... | V1+ | V2− |
|-----|-----|-----|-----|-----|-----|-----|-----|-----|-----|-----|
| V2− | V3+ | V4− | V5+ | V6− | V1+ | V2− | V3+ |     | V2− | V3+ |
| V3+ | V4− | V5+ | V6− | V1+ | V2− | V3+ | V4− |     | V3+ | V4− |
| V4− | V5+ | V6− | V1+ | V2− | V3+ | V4− | V5+ |     | V4− | V5+ |
| ⋮   |     |     |     |     |     |     |     |     |     |     |
| V6− | V1+ | V2− | V3+ | V4− | V5+ | V6− | V1+ |     | V6− | V1+ |

FRAME 2

| V2− | V3+ | V4− | V5+ | V6− | V1+ | V2− | V3+ | ... | V2− | V3+ |
|-----|-----|-----|-----|-----|-----|-----|-----|-----|-----|-----|
| V3+ | V4− | V5+ | V6− | V1+ | V2− | V3+ | V4− |     | V3+ | V4− |
| V4− | V5+ | V6− | V1+ | V2− | V3+ | V4− | V5+ |     | V4− | V5+ |
| V5+ | V6− | V1+ | V2− | V3+ | V4− | V5+ | V6− |     | V5+ | V6− |
| ⋮   |     |     |     |     |     |     |     |     |     |     |
| V6− | V1+ | V2− | V3+ | V4− | V5+ | V6− | V1+ |     | V6− | V1− |

FIG.14

FRAME 1

| a1+ | a2− | a3+ | a4− | a5+ | a6− | a7+ | a8− | ... | ak−1⁺ | ak− |
|-----|-----|-----|-----|-----|-----|-----|-----|-----|-------|-----|
| b1− | b2− | b3− | b4− | b5− | b6− | b7− | b8− |     | bk−1⁻ | bk+ |
| c1+ | c2− | c3+ | c4− | c5+ | c6− | c7− | c8+ |     | ck−1⁺ | ck− |
| d1− | d2+ | d3− | d4+ | d5− | d6+ | d7− | d8− |     | dk−1⁻ | dk+ |
| ⋮   |     |     |     |     |     |     |     |     |       |     |
|     |     |     |     |     |     |     |     |     |       |     |

FRAME 2

| a1− | a2+ | a3− | a4+ | a5− | a6+ | a7+ | a8− | ... | ak−1⁻ | ak+ |
|-----|-----|-----|-----|-----|-----|-----|-----|-----|-------|-----|
| b1+ | b2− | b3+ | b4− | b5+ | b6− | b7− | b8+ |     | bk−1⁺ | bk− |
| c1− | c2+ | c3− | c4+ | c5− | c6+ | c7+ | c8− |     | ck−1⁻ | ck+ |
| d1+ | d2− | d3+ | d4− | d5+ | d6− | d7− | d8+ |     | dk−1⁺ | dk− |
| ⋮   |     |     |     |     |     |     |     |     |       |     |
|     |     |     |     |     |     |     |     |     |       |     |

FIG.15

FRAME 1

| a1+ | a2+ | a3+ | a4+ | a5+ | a6+ | a7+ | a8+ | ... | ak-1+ | ak+ |
|-----|-----|-----|-----|-----|-----|-----|-----|-----|-------|-----|
| b1− | b2− | b3− | b4− | b5− | b6− | b7− | b8− |     | bk-1− | bk− |
| c1+ | c2+ | c3+ | c4+ | c5+ | c6+ | c7+ | c8+ |     | ck-1+ | ck+ |
| d1− | d2− | d3− | d4− | d5− | d6− | d7− | d8− |     | dk-1− | dk− |
| ⋮   |     |     |     |     |     |     |     |     |       |     |
|     |     |     |     |     |     |     |     |     |       |     |

FRAME 2

| a1− | a2− | a3− | a4− | a5− | a6− | a7− | a8− | ... | ak-1− | ak− |
|-----|-----|-----|-----|-----|-----|-----|-----|-----|-------|-----|
| b1+ | b2+ | b3+ | b4+ | b5+ | b6+ | b7+ | b8+ |     | bk-1+ | bk+ |
| c1− | c2− | c3− | c4− | c5− | c6− | c7− | c8− |     | ck-1− | ck− |
| d1+ | d2+ | d3+ | d4+ | d5+ | d6+ | d7+ | d8+ |     | dk-1− | dk− |
| ⋮   |     |     |     |     |     |     |     |     |       |     |
|     |     |     |     |     |     |     |     |     |       |     |

FIG. 16

FRAME 1

| a1+ | a2+ | a3+ | a4+ | a5+ | a6+ | a7+ | a8+ | ... | ak-1+ | ak+ |
|-----|-----|-----|-----|-----|-----|-----|-----|-----|-------|-----|
| b1+ | b2+ | b3+ | b4+ | b5+ | b6+ | b7+ | b8+ |     | bk-1+ | bk+ |
| c1+ | c2+ | c3+ | c4+ | c5+ | c6+ | c7+ | c8+ |     | ck-1+ | ck+ |
| d1+ | d2+ | d3+ | d4+ | d5+ | d6+ | d7+ | d8+ |     | dk-1+ | dk+ |
| ⋮   |     |     |     |     |     |     |     |     |       |     |
|     |     |     |     |     |     |     |     |     |       |     |

FRAME 2

| a1− | a2− | a3− | a4− | a5− | a6− | a7− | a8− | ... | ak-1− | ak− |
|-----|-----|-----|-----|-----|-----|-----|-----|-----|-------|-----|
| b1− | b2− | b3− | b4− | b5− | b6− | b7− | b8− |     | bk-1− | bk− |
| c1− | c2− | c3− | c4− | c5− | c6− | c7− | c8− |     | ck-1− | ck− |
| d1− | d2− | d3− | d4− | d5− | d6− | d7− | d8− |     | dk-1− | dk− |
| ⋮   |     |     |     |     |     |     |     |     |       |     |
|     |     |     |     |     |     |     |     |     |       |     |

FIG.17

CLAMP AND GAMMA CORRECTION CIRCUIT, AND IMAGE DISPLAY APPARATUS AND ELECTRONIC MACHINE EMPLOYING THE SAME

BACKGROUND OF THE INVENTION

1. Field of the Invention

This invention relates to a clamp and gamma correction circuit, and an image display apparatus and an electronic machine utilizing the clamp and gamma correction circuit, wherein the level of a image signal is clamped to a clamp voltage before the image signal is subjected to gamma correction.

2. Description of Related Art

Conventionally, in a liquid-crystal display, the black level of an image signal is clamped to a predetermined clamp voltage to make the image signal compatible with an appropriate voltage for driving the liquid crystal. Since the T-V curve that represents the characteristic of the liquid crystal in the relationship of transmissivity (T) and applied voltage (V) is steep in its rate of change in the vicinity of the black level, the gradation of the liquid crystal is known to drop in the vicinity of the black level. For this reason, gamma correction is performed by amplifying the image signal with different amplification factors depending on the level of the image signal.

It is a conventional practice, to gamma correct the image signal through a gamma correction circuit prior to clamping the black level of the image signal to the clamp voltage through a clamp circuit. However, clamping prior to gamma correction improves image quality. Thus, when adjusting the clamp voltage to its appropriate level the gradation of the liquid-crystal panel drops in the vicinity of a black level.

SUMMARY OF THE INVENTION

This invention provides a clamp and gamma correction circuit which processes a image signal through a clamp circuit and then a gamma correction circuit in that order to constantly perform a proper gamma correction with a clamp voltage adjusted to its appropriate value. This invention also provides an electronic machine and an image display apparatus which provides improved image quality by utilizing the clamp and gamma correction circuit of this invention.

The clamp and gamma correction circuit of this invention includes: a clamp circuit which receives an image signal varying between a first voltage and a second voltage and clamps one of the first and second voltages to a predetermined clamp voltage while maintaining a constant amplitude between the first and second voltage; a gamma correction circuit which receives the output of the clamp circuit and amplifies the output of the clamp circuit at different amplification factors depending on whether the output of the clamp circuit exceeds at least one predetermined reference voltage; and a voltage setting circuit that sets the clamp voltage and the at least one predetermined reference voltage to the clamp circuit and the gamma correction circuit, respectively, while varying both the clamp voltage and the at least one predetermined reference voltage, the voltage difference between the clamp voltage and the at least one predetermined reference voltage is maintained at a constant level.

In a first embodiment of this invention, the clamp voltage and the reference voltage vary in parallel while the voltage difference between the two is maintained at a constant level. Even when the clamp voltage is adjusted to its appropriate value, there will be no change in the relative relationship between the reference voltage, the point of change where the amplification factor of the gamma correction circuit changes, and the clamp voltage, which is the particular voltage to the image signal. Thus, a constant gamma correction is always performed to the image signal. When N amplification factors (N is an integer equal to or greater than 2) are employed in the gamma correction circuit, the reference voltages, the points when the amplification factor change (N−1), and the voltage difference between the clamp voltage and each of the (N−1) reference voltages are maintained at a constant level.

The voltage setting circuit includes: a variable voltage circuit; a constant voltage generator circuit which receives a varying input voltage and generates a constant voltage regardless of the value of the varying input a voltage; and voltage setting circuit for setting the clamp voltage and the at least one predetermined reference voltage to the clamp circuit and the gamma correction circuit, respectively, based on the output of the variable voltage circuit and the output of the constant voltage generator circuit.

In a second embodiment of this invention, when the clamp voltage is adjusted by the variable voltage circuit, the constant voltage is always generated by the constant voltage generator circuit regardless of the varying input voltage. Based on the constant voltage, the voltage difference between the clamp voltage and the reference voltage is kept constant.

In a third embodiment of this invention, the variable voltage circuit includes a transistor, the base of which is supplied with the input voltage, and the voltage between the base and the emitter of the transistor is the constant voltage. Thus, a relatively small voltage difference is easily generated using the base-emitter voltage that remains constant regardless the base voltage.

In a fourth embodiment of this invention, the voltage setting circuit includes a voltage divider circuit that divides the constant voltage. Dividing the base-emitter voltage creates an even smaller voltage difference between the clamp voltage and the reference voltage.

In a fifth embodiment of this invention, an image display apparatus includes the clamp and gamma correction circuit according to one of the four embodiments described above, and an image display device that provides an image based on an image signal that is processed through the clamp and gamma correction circuit. Thus, when the proper gamma correction is carried out while maintaining the clamp voltage to its appropriate value, the image displayed on the image display device has an improved image quality.

In a sixth embodiment of this invention, the image display device is a liquid-crystal panel that includes a liquid crystal interposed between a pair of substrates. Thus, even if a T-V curve has a steep rate of change in the vicinity of the black level, properly adjusting the clamp voltage prevents the black level of the image signal from saturating, and thus improves the gradation in the vicinity of the black level. A T-V curve represents the characteristics of a liquid crystal regarding the relationship between transmissivity (T) and applied voltage (V).

In a seventh embodiment of this invention, an electronic machine, such as a projector or a personal computer includes the image display apparatus described above.

BRIEF DESCRIPTION OF THE DRAWINGS

The preferred embodiments of this invention will be described in detail, with reference to the following figures, wherein:

FIG. 11 is an explanatory diagram showing the outputs of the sample/hold circuit of FIG. 6 which are reorganized in accordance with the positions of pixels during a dot reversal driving;

FIG. 12 is an explanatory diagram showing the outputs of the sample/hold circuit of FIG. 6 which are reorganized in accordance with the positions of pixels during a line reversal driving;

FIG. 13 is an explanatory diagram showing the outputs of the sample/hold circuit of FIG. 6 which are reorganized in accordance with the positions of pixels during a frame reversal driving;

FIG. 14 is an explanatory diagram showing the outputs of the sample/hold circuit of FIG. 6 which are reorganized in accordance with the positions of pixels when the sample/hold circuit phase expands pixel data that are different at their header addresses from frame to frame;

FIG. 15 is an explanatory diagram showing the polarities of pixel data when the dot reversal driving is performed in the manners shown in FIGS. 11 and 14;

FIG. 16 is an explanatory diagram showing the polarities of pixel data when the line reversal driving is performed in the manner shown in FIG. 12;

FIG. 17 is an explanatory diagram showing the polarities of pixel data when the frame reversal driving is performed in the manner shown in FIG. 13;

DETAILED DESCRIPTION OF PREFERRED EMBODIMENTS

Figure 1:
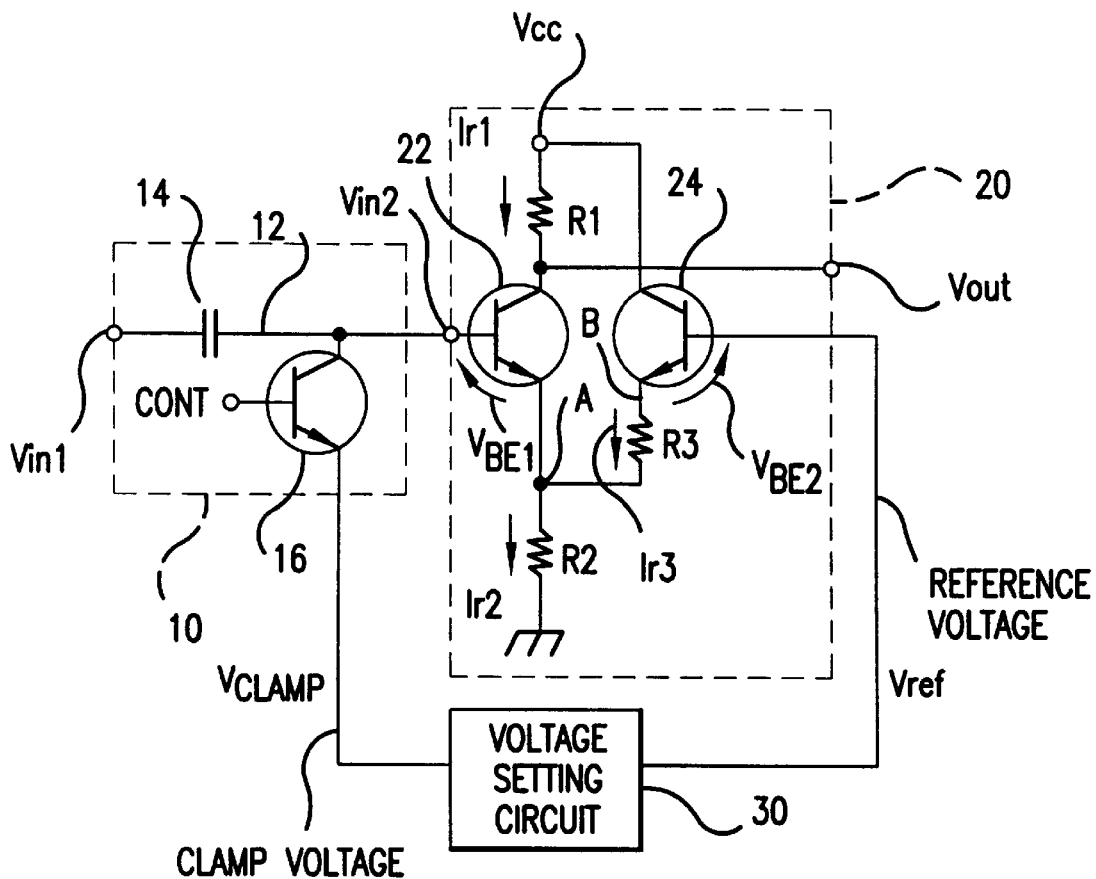
FIG. 1 is a schematic diagram showing an exemplary clamp and gamma correction circuit of the present invention.

FIG. 1 is a schematic diagram showing an embodiment of the clamp and gamma correction circuit of this invention. As shown, the circuit includes a clamp circuit 10, a gamma correction circuit 20, and a voltage setting circuit 30. The clamp circuit 10 includes a signal line 12 to which a image signal Vin1 is applied, a capacitor 14 connected in series in the middle of the signal line 12 and a charging transistor 16 connected to the signal line 12. The emitter of the charging transistor 16 is supplied with a clamp voltage $V_{CLAMP}$ and the collector of the charging transistor 16 is connected to the signal line 12. The charging transistor 16 receives at its base a clamp control signal CONT.

Figure 2A:
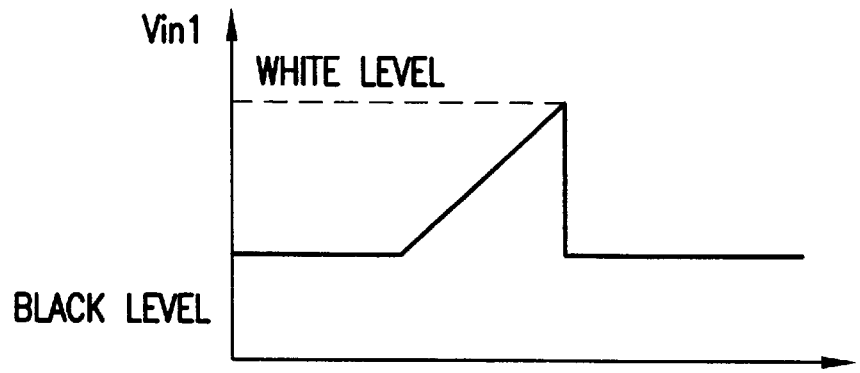
FIG. 2A shows an input image signal.

The image signal Vin1 varies between a white level and a black level as shown in FIG. 2A. For example, with the white level being at 5 V and the black level being at 2 V. The control signal CONT applied to the base of the charging transistor 16 of the clamp circuit 10 corresponds to a vertical retrace period or horizontal retrace period prior to the input of image signal Vin1. The control signal CONT is transitioned to a logic high when the black level is applied to the signal line 12. The charging transistor 16 is then turned on, charging the capacitor 14 with the clamp voltage $V_{CLAMP}$. Later, the control signal CONT is transitioned to a logic low, turning the charging transistor 16 off. When the image signal Vin1 is applied to the signal line 12, the black level is clamped to the clamp voltage $V_{CLAMP}$.

Figure 2B:
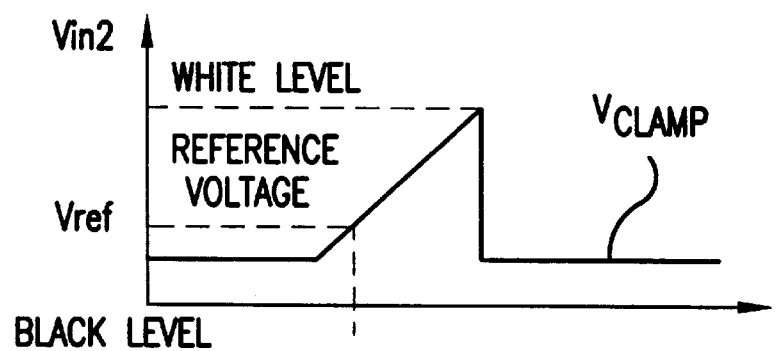
FIG. 2B shows the characteristics of a image signal that is obtained by clamping the image signal of FIG. 2A.

FIG. 2B shows the output of the clamp circuit 10 which is the image signal Vin2. The image signal Vin2 is applied to the subsequent stage gamma correction circuit 20. In the image signal Vin2 shown in FIG. 2B, the clamp voltage $V_{CLAMP}$ is 1.2 V, and if compared with the image signal Vin1 in FIG. 2A, the black level is lower. However, the amplitude between the black level and the white level kept at a constant value, 3 V.

As shown in FIG. 1, the gamma correction circuit 20 includes a resistor R1, an input transistor 22, and a resistor R2 connected in series between a power supply Vcc and ground. The base of the input transistor 22 is supplied with the image signal Vin2 that is the output of the clamp circuit 10. When the input transistor 22 is turned on, its base-emitter voltage becomes $V_{BE1}$.

Connected between the power supply Vcc and one end of the resistor R2 are the network of a current control transistor 24 and a resistor R3 in parallel with the network of the transistor R1 band the input transistor 22. The base of the current control transistor 24 is supplied with a reference voltage Vref set by the voltage setting circuit 30. A terminal for picking up an output $V_{out}$ of the gamma correction circuit 20 is connected to the node of the resistor R1 and the collector of the input transistor 22.

Figure 2C:
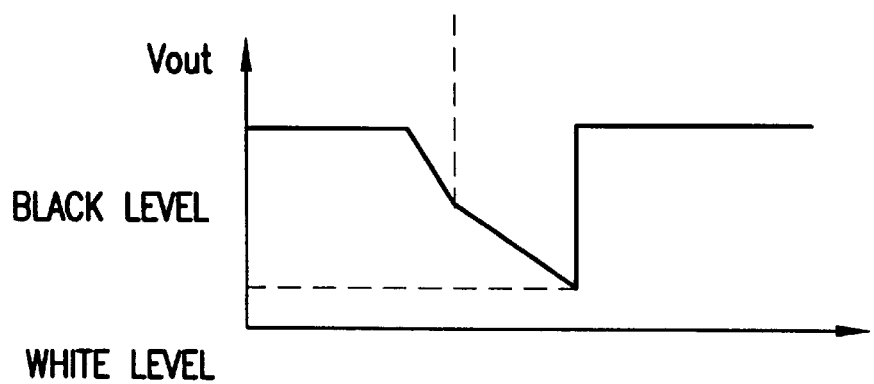
FIG. 2C shows a image signal that is obtained by gamma correcting the image signal of FIG. 2B.

The operation of the gamma correction circuit 20 is now discussed referring to FIGS. 2B and 2C. The gamma correction circuit 20 to which the image signal Vin2 shown in FIG. 2B is input, outputs a image signal shown in FIG. 2C as the output $V_{out}$.

In the gamma correction circuit 20, the image signal Vin2 shown in FIG. 2B is inverted and amplified. Considering the reference voltage Vref as a threshold, the amplification factor in a signal voltage region closer to the black level than the reference voltage Vref is set to be higher than that in the remaining signal voltage region. This gamma correction compensates for a reduction of tonal gradation arising from a steep rate of change near the black level over the T-V curve.

The operation of the gamma correction circuit 20 is discussed on a case-by-case basis.

(a) Image signal Vin2≧Vref

Since the base-emitter voltage of the input transistor 22 with its base supplied with the image signal Vin2 is $V_{BE1}$, the voltage at the node A in FIG. 1 is Vin2−$V_{BE1}$. Since the base-emitter voltage of the current control transistor 24 with its base supplied with the reference voltage Vref is $V_{BE2}$, the voltage at the node B in FIG. 2 is Vref−$V_{BE2}$.

Since $V_{BE1}=V_{BE2}=0.7$ V, the voltage at the node B at one end of the resistor R3 is higher than the voltage at the node A at the other end of the resistor R3, providing Vin2≧Vref, and no current flows through the resistor R3. Considering that the base current $I_B$ of the input transistor 22 is sufficiently small, collector current $I_C$ and emitter current $I_E$ of the input transistor 22 are expressed as follows:

$$I_E=(Vin2-V_{BE1})/R2$$

$$I_C=I_E-I_B=I_E$$

Ir1 represents a current flowing through the first resistor R1, and the output $V_{out}$ of the gamma correction circuit 20 is expressed as follows:

$$V_{out}=Vcc-Ir1 \cdot R1=Vcc-I_E \cdot R1=Vcc-(Vin2-V_{BE1})R1/R2 \quad (1)$$

(b) Image signal Vin2<Vref

If Vin2<Vref, the voltage Vref−$V_{BE2}$ at the node B at the one end of the resistor R3 is always higher than the voltage Vin2−$V_{BE1}$ at the other end of the resistor R3. Unlike case (a), a current flows through the resistor R3.

Ir3 represents the current flowing through the third resistor R3. The current Ir2 flowing through the second resistor R2 is expressed as follows:

$$Ir2=I_E+Ir3=(Vin2-V_{BE1})/R2 \quad (2)$$

On the other hand, considering that $V_{BE1}=V_{BE2}=0.7$ V, the current Ir3 flowing through the third resistor R3 supplied with the voltage between nodes A and B is as follows:

$$Ir3=[(Vref-V_{BE2})-(Vin2-V_{BE1})]/R3=(Vref-Vin2)/R3 \quad (3)$$

The following equation is derived from equations (2) and (3).

$$I_E=[(Vin2-V_{BE1})/R2]-[(Vref-Vin2)/R3]$$

Since the current Ir1 flowing through the first resistor R1 can be expressed as $Ir1=I_C=I_E$, the output $V_{out}$ of the gamma correction circuit is $$V_{out}=Vcc-Ir1 \times R1=Vcc-I_C \cdot R1=Vcc-I_E \cdot R1=Vcc-R1\{[(Vin2-V_{BE1})/R2-(Vref-Vin2)/R3]\}=Vcc-(Vin2-V_{BE1})R1/R2+(Vref-Vin2)R1/R3 \quad (4)$$

Comparing equation (1) with equation (4), the output voltage is increased by the third term in equation (4). In this way, when the image signal Vin2 shown in FIG. 2B is input, gamma correction featuring the characteristics shown in FIG. 2C is performed.

In a liquid-crystal panel, unless a black level appropriate for the liquid-crystal panel is set, the black level will be saturated on screen, and the gradation in the vicinity of the black level will drop. For this reason, the voltage setting circuit 30 in this embodiment makes the clamp voltage $V_{CLAMP}$ of the clamp circuit 10 variable within a certain range in the manufacturing process of the circuit. It is optional to leave the adjustment of the clamp voltage to the responsibility of a user. If the clamp voltage $V_{CLAMP}$ is changed, the point where the amplification factor changes in FIG. 2C will be shifted. Thus, the voltage setting circuit 30 permits the reference voltage Vref to change while the difference between the clamp voltage $V_{CLAMP}$ and the reference voltage Vref is kept constant. The voltage setting circuit 30 sets the clamp voltage $V_{CLAMP}$ in the clamp circuit 10 and the reference voltage Vref in the gamma correction circuit 20, and maintains the difference ($V_{CLAMP}$−Vref) at a constant level.

Figure 3:
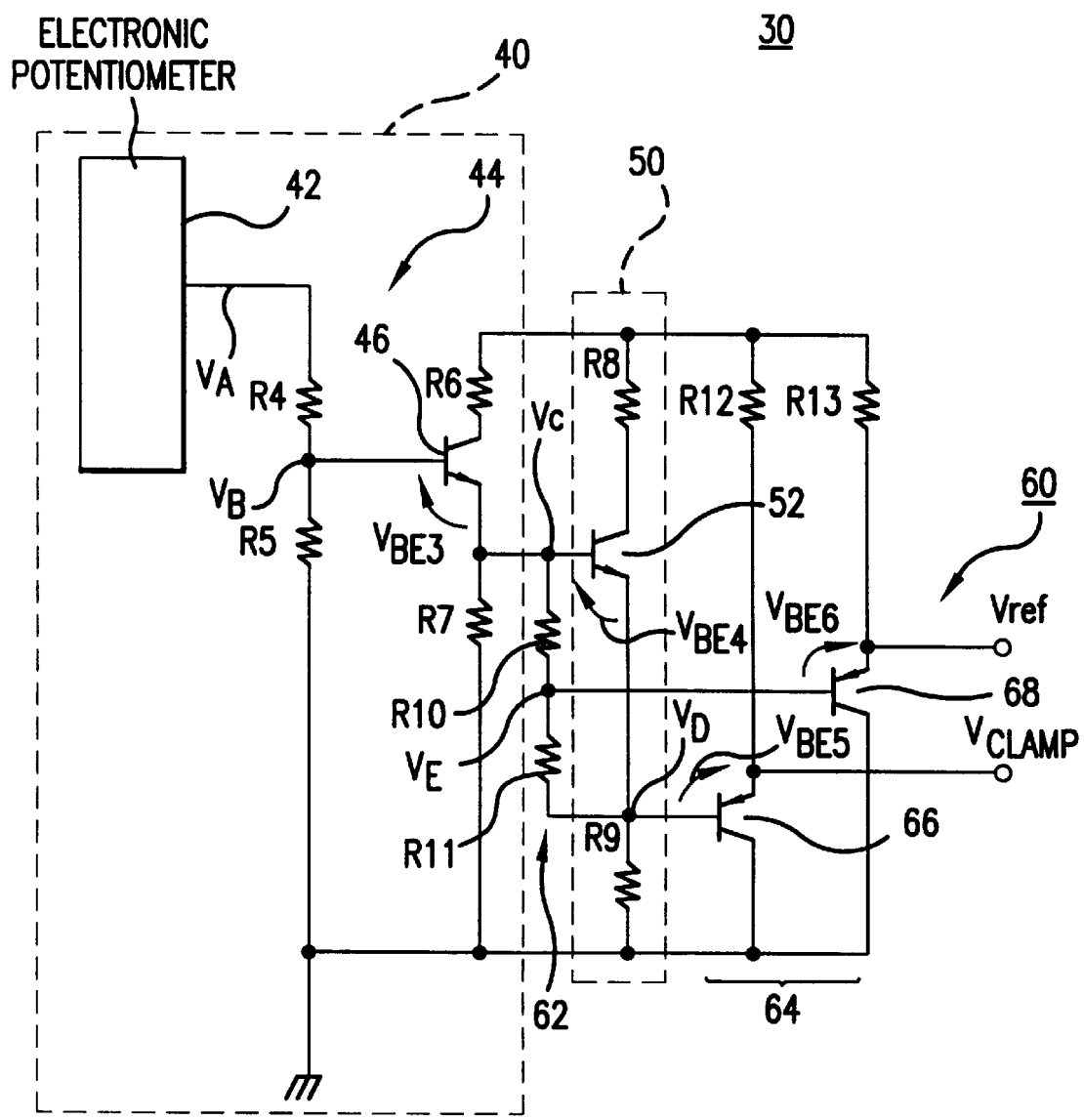
FIG. 3 is a schematic diagram showing an exemplary voltage setting circuit of FIG. 1.

FIG. 3 shows an example of the voltage setting circuit 30. The voltage setting circuit 30 includes a voltage variable circuit 40, a constant voltage generator means 50 which receives a varying input voltage and generates a constant voltage regardless the value of the input voltage, and voltage setting circuit 60. The voltage setting circuit 60 set the clamp voltage $V_{CLAMP}$ and the reference voltage Vref based on the outputs of the voltage variable circuit 40 and the constant voltage generator circuit 50. The voltage setting circuit 60 keep the voltage difference between the clamp voltage $V_{CLAMP}$ and the reference voltage Vref at a constant level.

The variable voltage circuit 40 includes an electronic potentiometer 42 providing a variable output voltage and a buffer 44. The buffer 44 includes resistors R4–R7 and a transistor 46. The electronic potentiometer 42 varies an output voltage $V_A$ within a range of 0 to 5 V. The voltage $V_B=V_A \cdot R4/(R4+R5)$, and is applied to the base of the transistor 46.

The transistor 46 is turned on by the voltage $V_C$. $V_C=V_B-0.7=V_A \cdot R4/(R4+R5)-0.7$, because the base-emitter voltage of the transistor 46 is $V_{BE3}=0.7$ V. By varying the output voltage $V_A$ of the electronic potentiometer 42, the voltage $V_C$ is also rendered variable.

Figure 4:
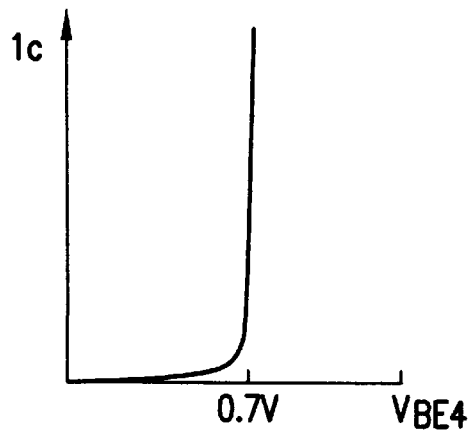
FIG. 4 shows the relationship of the collector current to the base-emitter voltage of a transistor shown in FIG. 3.

The constant voltage generator circuit 50 includes a transistor 52, and resistors R8, R9 as shown in FIG. 3. The base-emitter voltage $V_{BE4}$ of the transistor 52 with its base supplied with the voltage $V_C$ is constantly approximately 0.7 V regardless of the collector current $I_C$ (=$V_D$/R9) of the transistor 52 that varies depending on the voltage $V_C$ applied to the base as shown in FIG. 4. Therefore, the constant voltage generator circuit 50 keeps the voltage ($V_C-V_D$)=$V_{BE4}$ to equal approximately 0.7 V regardless of the value of the input voltage $V_C$.

The voltage setting circuit 60 includes a voltage divider 62 which includes resistors R10, R11, and a buffer 64. The buffer 64 includes resistors R12, R13, and two transistors 66, 68.

The voltage divider 62 voltage divides the constant voltage ($V_C-V_D$) generated by the constant voltage generator means 50, through resistors R10 and R11. The voltage $V_E$ shown in FIG. 3 equals $V_C-(V_C-V_D) \cdot R10/(R10+R11)=V_C-V_{BE4} \cdot R10/(R10+R11)$. The voltage $V_D$ in FIG. 3 is $V_C-V_{BE4}$.

These voltages become the clamp voltage $V_{CLAMP}$ and the reference voltage Vref through the buffer 64, respectively. Suppose that the base-emitter voltage of the transistor 66 is $V_{BE5}=0.7$ V and that the base-emitter voltage of the transistor 68 is $V_{BE6}=0.7$ V, then, $$V_{CLAMP}=V_D+V_{BE5}=V_C-V_{BE4}+V_{BE5}$$

$$Vref=V_E+V_{BE6}=V_C-V_{BE4} \cdot R10/(R10+R11)+V_{BE6}$$

Since the resistance values of the resistors R10, R11 are fixed ones and the base-emitter voltage of each transistor is also fixed, the voltage difference ($V_{CLAMP}$–Vref) remains continuously constant even if both the clamp voltage $V_{CLAMP}$ and the reference voltage Vref are changed by the change of $V_C$ through the electronic potentiometer 42.

When R4=3.3 kΩ, R5=10 kΩ, R6=10 kΩ, R7=1 kΩ, R8=10 KΩ, R9=2.2 kΩ, R10=5.1 kΩ, R11=2.2 kΩ, R12=4.7 kΩ, and R13=4.7 kΩ, and when $V_A$=2.5 V, $V_B$=1.9 V, $V_C$=1.2 V, $V_D$=0.7 V, and $V_E$=0.5 V, the clamp voltage $V_{CLAMP}$=1.2 V and the reference voltage Vref=1.4 V. Thus, the voltage difference (Vref–$V_{CLAMP}$)=0.2 V. However, when $V_A$=5 V, $V_B$=3.8 V, $V_C$=3.1 V, $V_D$=2.8 V, and $V_E$=2.6 V, the clamp voltage $V_{CLAMP}$=3.1 V and the reference voltage Vref=3.3 V. Thus, the voltage difference remains the same or constant (Vref–$V_{CLAMP}$)=0.2 V.

Figure 5:
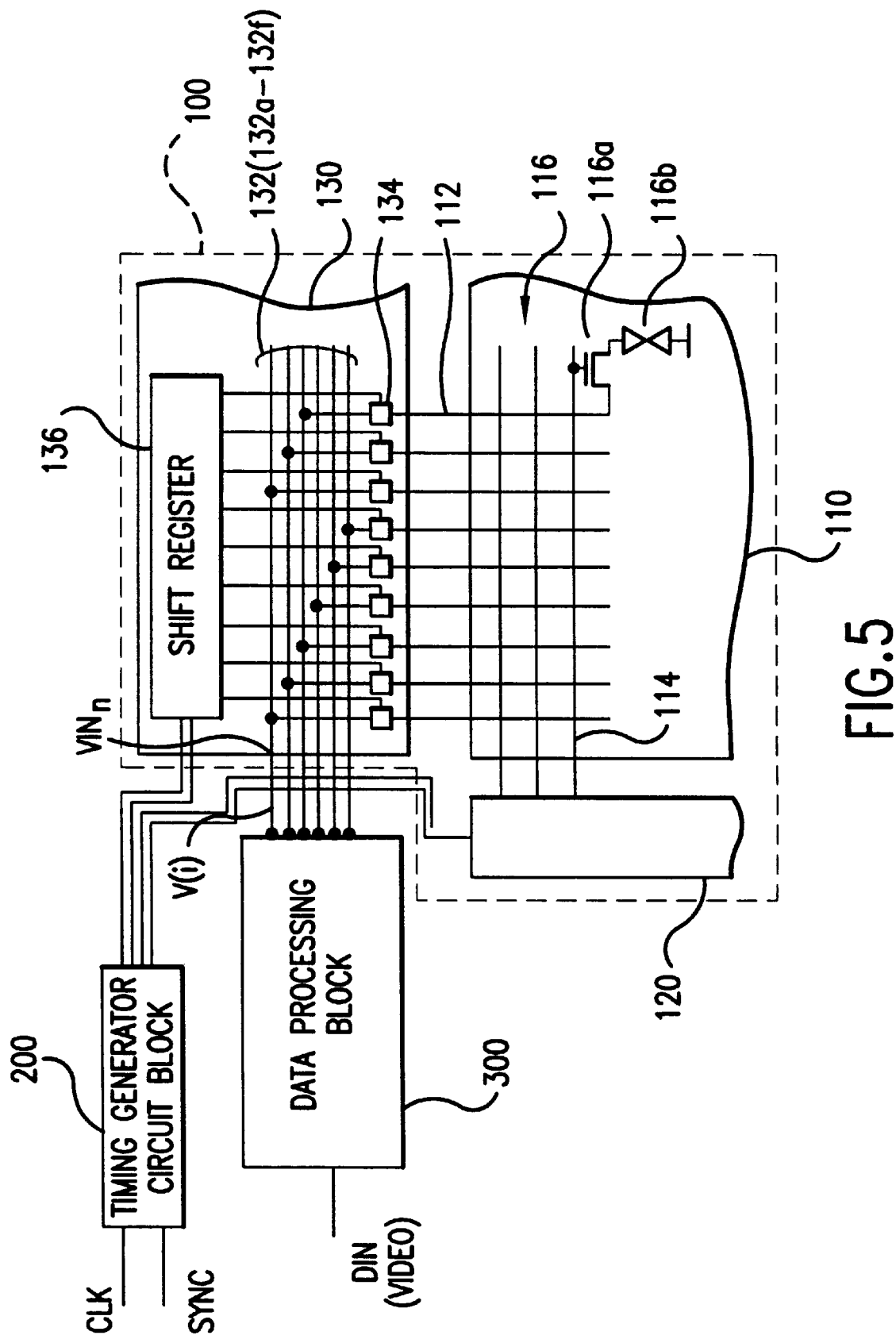
FIG. 5 is a block diagram showing an exemplary video display apparatus of this invention.

FIG. 5 shows an example of an image display apparatus utilizing this invention. As shown in FIG. 5, the image display apparatus includes an active matrix type liquid-crystal panel 110, a liquid-crystal panel block 100, a timing generator circuit block 200, and a data processing circuit block 300. The liquid crystal block 100 includes on the same glass substrate, the liquid-crystal panel 110, a scanning-driver IC 120 which provides a scanning electrode selecting means, and a data-driver IC 130 as signal supplying means.

The liquid-crystal panel 110 includes pixels 116 arranged in a matrix and electrically connected to a plurality of data electrodes 112 and a plurality of scanning electrodes 114. Each pixel 116 is constructed of a switching element, for example, a thin-film transistor (TFT) 116a and a liquid-crystal layer 116b. The switching element 116a is not limited to the TFT representative of triode elements, and alternatively, a metal layer-insulating layer-metal layer (MIM) element representative of diode elements is perfectly acceptable. When this invention is used to drive a liquid-crystal panel, the liquid-crystal panel is not limited to the active matrix type. Passive matrix type liquid-crystal panels are perfectly acceptable and thus switching elements 116a are not necessarily needed.

The scanning-driver IC 120 feeds to the scan signal lines 114. A scan signal which sequentially selects switching elements 116a are connected to the respective scanning electrodes 114. The data-driver IC 130 includes six signal supplying lines 132, a plurality of sampling switches 134 connected between the six signal supplying lines 132 and a plurality of data electrodes 112, a shift register 136 for outputting, to the plurality of sampling switches 134, timing signals that determine sampling timings. The timing generator circuit block 200 feeds a variety of timing signals to the liquid-crystal panel block 100 and the data processing circuit block 300.

Figure 6:
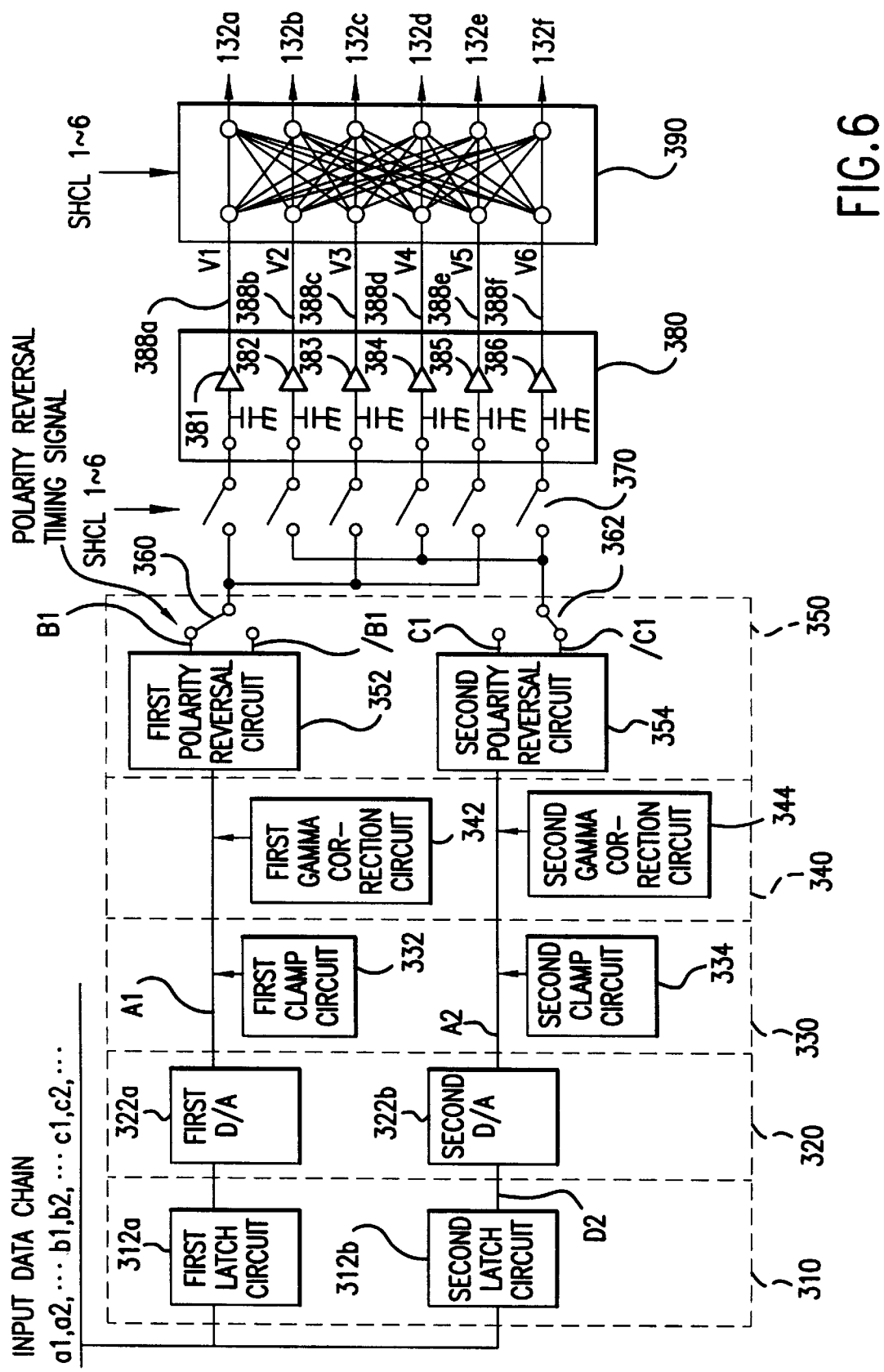
FIG. 6 is a detailed block diagram showing a data processing circuit block of the image display apparatus of FIG. 5.

Referring to FIG. 6, the data processing circuit block 300 includes a first phase expansion circuit 310, a digital-to-analog converter circuit 320, a clamp circuit 330, a gamma correction circuit 340, a polarity reversal circuit 350, a second phase expansion circuit 380, and a connection switching circuit (rotation circuit) 390.

The first phase expansion circuit 310 sequentially receives digital pixel data a1, a2, a3, . . . to be applied to pixels 116 connected to a first row scanning electrode 114, and then digital pixel data b1, b2, b3, . . . to be applied to pixels 116 connected to a second row scanning electrode as shown in FIG. 5.

Figure 7A:
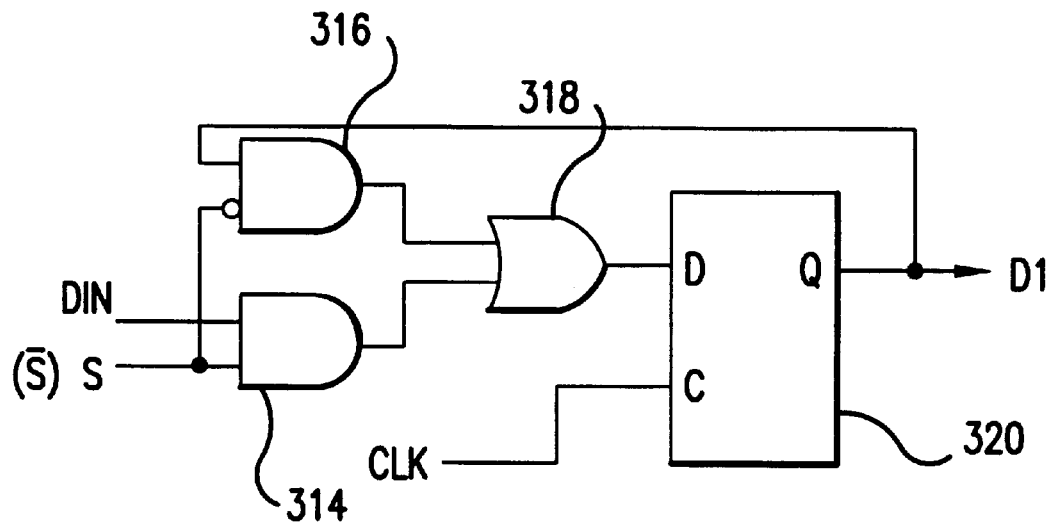
FIGS. 7A and 7B are schematic diagrams showing first and second latch circuits shown in FIG. 6.
Figure 7B:
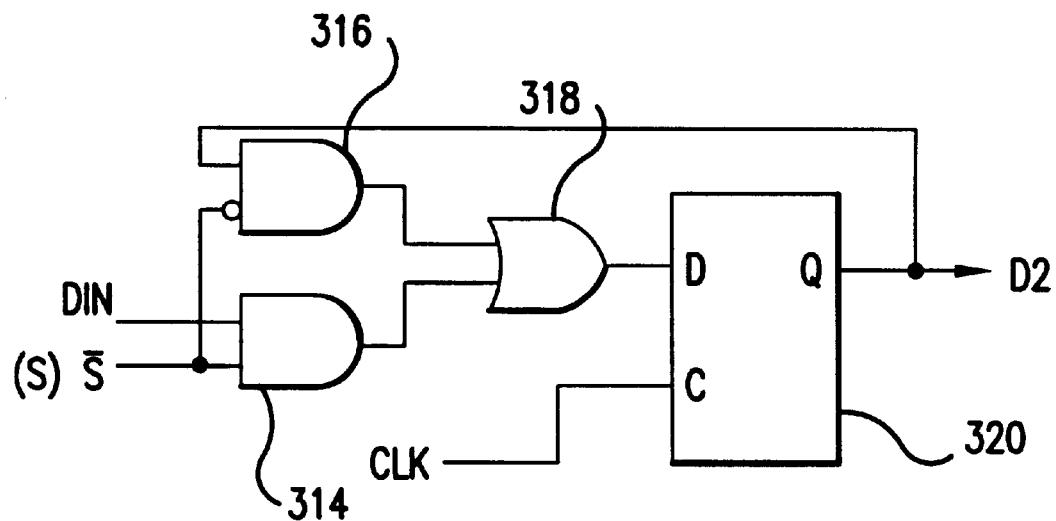

The first phase expansion circuit 310 includes a first latch circuit 312a and a second latch circuit 312b, to each of which these digital pixel data are together input. The first and second latch circuits 312a, 312b are identical in construction as shown in FIGS. 7A and 7B, and each includes first and second AND gates 314, 316, an OR gate 318, and a flipflop 320.

Each of the first AND gates 314 of the first and second latch circuits 312a and 312b receives the above-described digital pixel data signal DIN, and a clock signal S(20 MHz, for example) into which a reference clock signal CLK (40 MHz, for example) is frequency-divided, or receives inverted clock signal $\overline{S}$ from the timing generator circuit block 200. In accordance with a horizontal synchronization timing and/or a vertical synchronization timing, the timing generator circuit block 200 switches the destinations of the divided clock signal S and inverted divided clock signal $\overline{S}$ in a manner such that the inverted divided clock signal $\overline{S}$ is applied to the second latch circuit 312b when the divided clock signal S is applied to the first latch circuit 312a. In this sense, the timing generator circuit block 200 functions as modifying means for modifying the phase expansion order in the first phase expansion circuit 310.

The OR gate 318 receives the outputs of the first and second AND gates 314, 316, and gives its output to a D terminal of the flipflop 320. The flipflop 320 receives, at its clock terminal C, the reference clock signal CLK. The reference clock signal CLK, the divided clock signal S and the inverted divided clock signal $\overline{S}$ are all supplied by the timing generator circuit block 200.

Figure 8:
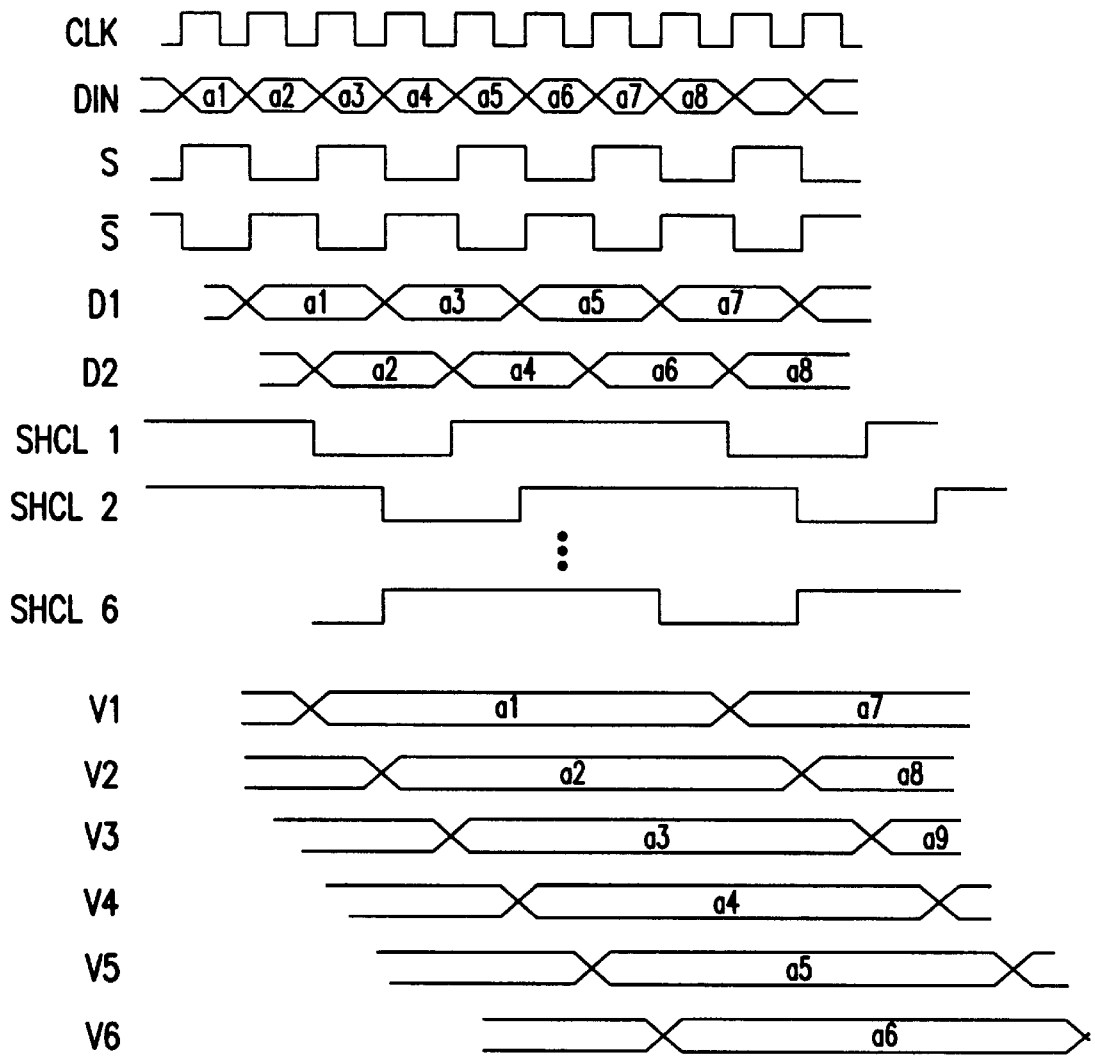
FIG. 8 is a timing diagram illustrating a data expansion operation performed by first and second phase expansion circuits.

Referring to FIG. 8, for example, when receiving the divided clock S, the first latch circuit 312a latches data a1 at a falling edge of the divided clock signal S. Since the output of the second AND gate 314 is driven high at the moment the divided clock signal S is transitioned to a low level, data a1 is continuously output at the Q output. This condition continues until data a3 is latched at a next falling edge of the divided clock signal S. Therefore, the first latch circuit 312a latches data a1, a3, a5, . . . so that these data signals are extended in data length to be twice as long as their original lengths. The output signal from the first latch circuit 312a is designated a digital phase-expanded signal D1. In the second latch circuit 312b to which the inverted divided clock signals $\overline{S}$ is applied, data a2, a4, a6, . . . are latched as shown in FIG. 8, and their data lengths are extended to be twice as long as their original lengths. The second latch circuit 312b provides output signal with a delay of one period of the reference clock signal CLK (half period of the divided clock S). The output signal from the second latch circuit 312b is designated a digital phase-expanded signal D2. In this way, the first phase expansion circuit 310 phase expands the input digital image data DIN into two digital phase-expanded signals D1, D2 having data length extended.

The digital-to-analog converter circuit 320 includes a first digital-to-analog converter circuit 322a for digital-to-analog converting the digital phase-expanded signal D1 output by the first latch circuit 312a, and a second digital-to-analog converter circuit 322b for digital-to-analog converting the digital phase-expanded signal D2 output by the second latch circuit 312b. Since the first and second digital-to-analog converter circuits 322a, 322b sample data at the timing of the divided clock signal S for digital-to-analog conversion, compact and low-cost design is achieved. The output of the first digital-to-analog converter circuit 322a is designated a first phase-expanded analog signal A1, while the output of the second digital-to-analog converter circuit 322b is designated a second phase-expanded analog signal A2. The first and second phase-expanded analog signals A1 and A2 correspond to the image signal Vin1 shown in FIG. 2A.

The clamp circuit 330 and the gamma correction circuit 340 are connected to each output line of the first and second digital-to-analog converter circuits 322a, 322b. As the clamp circuit 330, a first clamp circuit 332 is connected to the output line of the first digital-to-analog converter circuit 322a. A second clamp circuit 334 is connected to the output line of the second digital-to-analog circuit 322b. The clamp circuit 10 shown in FIG. 1 performs the same functions as the first and second clamp circuits 332 and 334. The gamma correction circuit 340 includes a first gamma correction circuit 342 connected to the output line of the first digital-to-analog converter circuit 322a, and a second gamma correction circuit 344 connected to the output line of the second digital-to-analog converter circuit 322b. The gamma correction circuit 20 shown in FIG. 1 performs the same functions as the first and second gamma circuits 342 and 344. The voltage setting circuit 30 shown in FIGS. 1 and 2 applies the clamp voltage $V_{CLAMP}$ to both the first and second clamp circuits 332, 334 and applies the reference voltage Vref to both the first and second gamma correction circuits 342 and 344.

The polarity reversal circuit 350 reverses the polarities of the phase-expanded analog clamped and gamma corrected signals A1 and A2 to be a signal of one polarity, for example a positive polarity or a negative polarity with respect to the reference voltage. Thus, the polarity of the voltage applied to the pixel 116 is reversed in relation to the scan signal. To reverse the polarity of the voltage applied to the pixel 116, the voltage of the data signal is changed to reverse its polarity relative to the voltage of the opposing (common) electrodes if the switching element 116a is constructed of a TFT. If the switching element 116a is constructed of an MIM, the voltage of the scan signal is changed to reverse its polarity relative to the intermediate voltage of the data signal.

In this embodiment, the polarity reversal circuit 350 includes a first polarity reversal circuit 352 for converting the first phase-expanded analog signal A1 to positive and negative first phase-expanded analog signals B1 and $\overline{B1}$, and a second polarity reversal circuit 354 for converting the second phase-expanded analog signal A2 to positive and negative second phase-expanded analog signals C1 and $\overline{C1}$. These signals are output through switches 360 and 362 that are controlled by polarity reversal timing signals.

The second phase expansion circuit 380 includes six sample/hold circuits, 381–386. The positive or negative first phase-expanded analog signal B1 or $\overline{B1}$ is always applied to odd-numbered sample/hold circuits 381, 383 and 385 in the second phase expansion circuit 380 via a switch 370. The positive or negative second phase-expanded analog signal C1 or $\overline{C1}$ is always applied to even-numbered sample/hold circuits 382, 384 and 386 in the second phase expansion circuit 380 via the switch 370. Referring to FIG. 8, the first through sixth sample/hold circuits 381–386 receive sampling clock signals SHCL1-SHCL6 that determine the order of phase expansion. The first phase-expanded analog signal is further expanded into N phases, typically three phases. The original digital image data signal DIN is already phase-expanded by the first phase expansion circuit 310 into n phases, for example, two phases here. When the second phase expansion circuit 380 three-phase-expands the signals, the original digital image data signal DIN is six-phase-expanded into six phase-expanded signals. The data length of the phase-expanded signal at each phase from the second phase expansion circuit 380 is six times as long as the original digital image data signal DIN.

Figure 9:
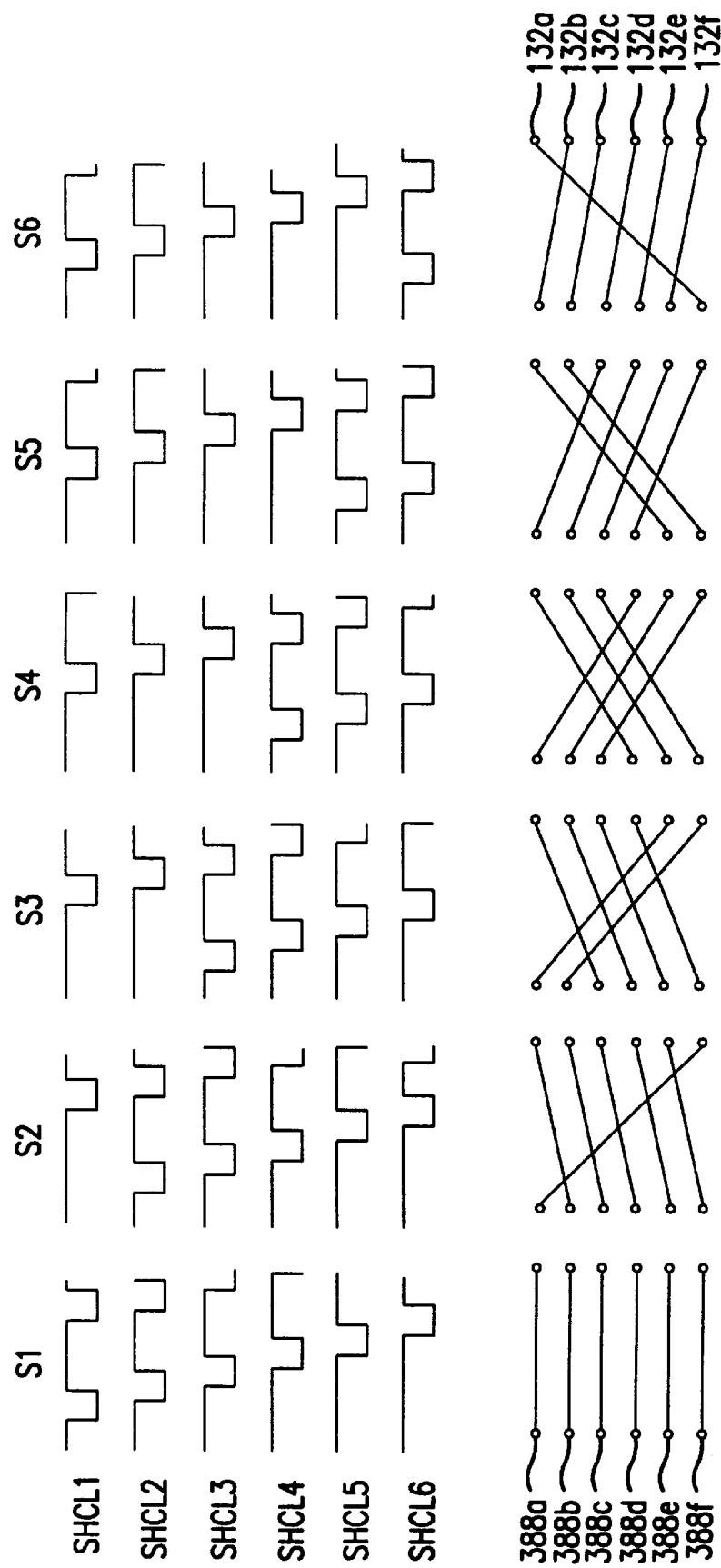
FIG. 9 is a diagram showing types of sampling signals input to the second phase expansion circuit of FIG. 6 and line connection statuses that are switched by a connection switching circuit in accordance with the types of the sampling signals.
Figure 10:
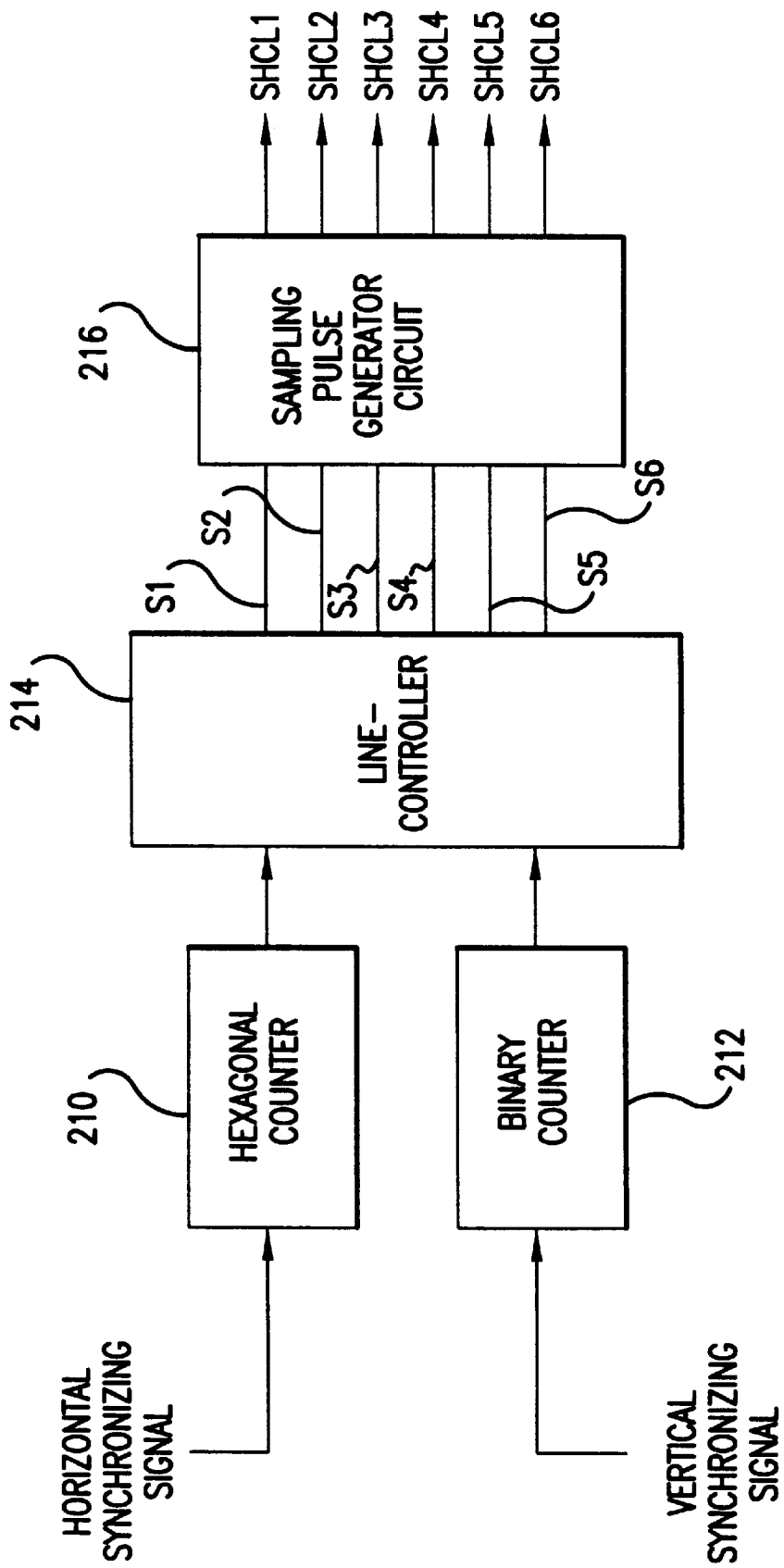
FIG. 10 is a block diagram showing part of the timing generator circuit block of FIG. 6.

As shown in FIG. 9, there are available six sampling clock signals SHCL1-SHCL6, which are generated by the timing generator circuit block 200 in response to select signals S1–S6. This apparatus switches the supply of the six sampling clock signals SHCL1-SHCL6 based on the horizontal synchronization and vertical synchronization of the liquid-crystal panel 110. To this end, the timing generator circuit block 200 has a hexagonal counter 210 and a binary counter 212 as shown in FIG. 10. The hexagonal counter 210 counts a horizontal synchronizing signal. The binary counter 212 counts a vertical synchronizing signal. A line controller 214 that receives the outputs from both counters 210 and 212, switches and outputs sequentially the select signals S1–S6 each time the hexagonal counter 210 counts, for each horizontal scan (H) at the moment a new scanning electrode 114, shown in FIG. 1, is selected.

Furthermore, the line controller 214 switches the order of the select signals S1–S6 outputted each time the binary counter 212 counts, for each vertical scan (1 V) when one frame driving of the liquid-crystal panel 110, shown in FIG. 5, is completed. For example, the line controller 214 may start with signal S1 at a first frame, while starting with S2 at a second frame. The six types of sampling clock signals SHCL1-SHCL6 are generated in a sampling pulse generator circuit 216 to which the select signals S1–S6 are applied. The timing generator circuit block 200 includes an unshown circuit which, in response to the select signals S1–S6, determines which clock signal, divided clock signal S or inverted divided clock signal $\overline{S}$, to apply to the first or second latch circuits 312a, 312b in the first phase expansion circuit 310.

Outputs from the phase-expanded signal output lines 388a–388f of the first through sixth sample/hold circuits 381–386 are designated V1–V6, respectively. If the outputs V1–V6 are arranged in alignment with the positions of pixels, the four driving methods shown in FIGS. 11 through 14 are utilized.

Referring to FIG. 11, in frames 1 and 2, the sampling order is switched with S1 at a first line, S2 at a second line, S3 at a third line, . . . and S6 at a sixth line, these are repeated on further lines. If the number of lines per frame is a multiple of six, which is the number of expansion, the frame 2 is identical to the frame 1. Regardless of whether the number of lines per frame is a multiple of six, the frames 1 and 2 become identical in the order of phase expansion if the sampling is reset at the end of each frame.

Plus (+) and minus (−) signs shown in FIG. 11 indicate the polarities of data sampled and held, and the dot reversal driving is made possible as shown in FIG. 11 by allowing the signal from the timing generator circuit block 200 to control the first and second digital switches 342 and 344. FIG. 15 is created if pixel data is substituted in FIG. 11.

Referring to FIGS. 12 and 13, the sampling order remains unchanged from that in FIG. 11, but the selection by the first and second digital switches 342 and 344 is changed. FIG. 12 shows the line reversal driving, and FIG. 16 is created if pixel data is substituted. FIG. 13 shows the frame reversal driving, and FIG. 17 is created if pixel data is substituted.

FIG. 14 shows the sampling order with the most excellent display characteristic, wherein the frame 1 remains the same as that in FIG. 11, while the frame 2 is different from that in FIG. 11. As shown FIG. 14, the sampling order at the first line in the frame 2 is made different from that in the frame 1 so that the first line in the frame 2 is identical to the second line in the frame 1. More particularly, the order of phase expansion is modified starting with the select signal S1 in the frame 1 while the order of phase expansion is modified starting with the select signal S2 in frame 2. This process results in the dot reversal driving shown in FIG. 15, where image data is substituted.

The connection switching circuit (rotation circuit) 390 switches the connection between the six phase-expanded signal output lines 388a–388f and six signal supplying lines 132a–132f so that the pixel data is supplied as shown in FIGS. 15 through 17. The switching of this connection must be performed in synchronization with the switching of phase expansion order performed in the first and second phase expansion circuits 310 and 380. The phase expansion order is selected from among six types shown in FIG. 9 based on the signal from the timing generator circuit block 200. With such switching, the dot reversal driving, line reversal driving and frame reversal driving shown in FIGS. 15–17, respectively, are performed. From the standpoint of the life of liquid crystal, the dot reversal driving in FIG. 15 outperforms the others.

In any of the above driving processes, even if the amplifiers of the first through sixth sample/hold circuits 381–386 suffer variations in gain, with one particular amplifier with a higher gain, the liquid-crystal panel 110 is free from, brighter pixels consecutively aligned in a vertical line unlike the conventional apparatus. Thus, brighter pixels are diagonally scattered making themselves less visible. In particular, the switching method shown in FIG. 14 presents better image quality because the sampling order is modified from frame to frame, to modify the positions of brighter pixels.

Figure 18:
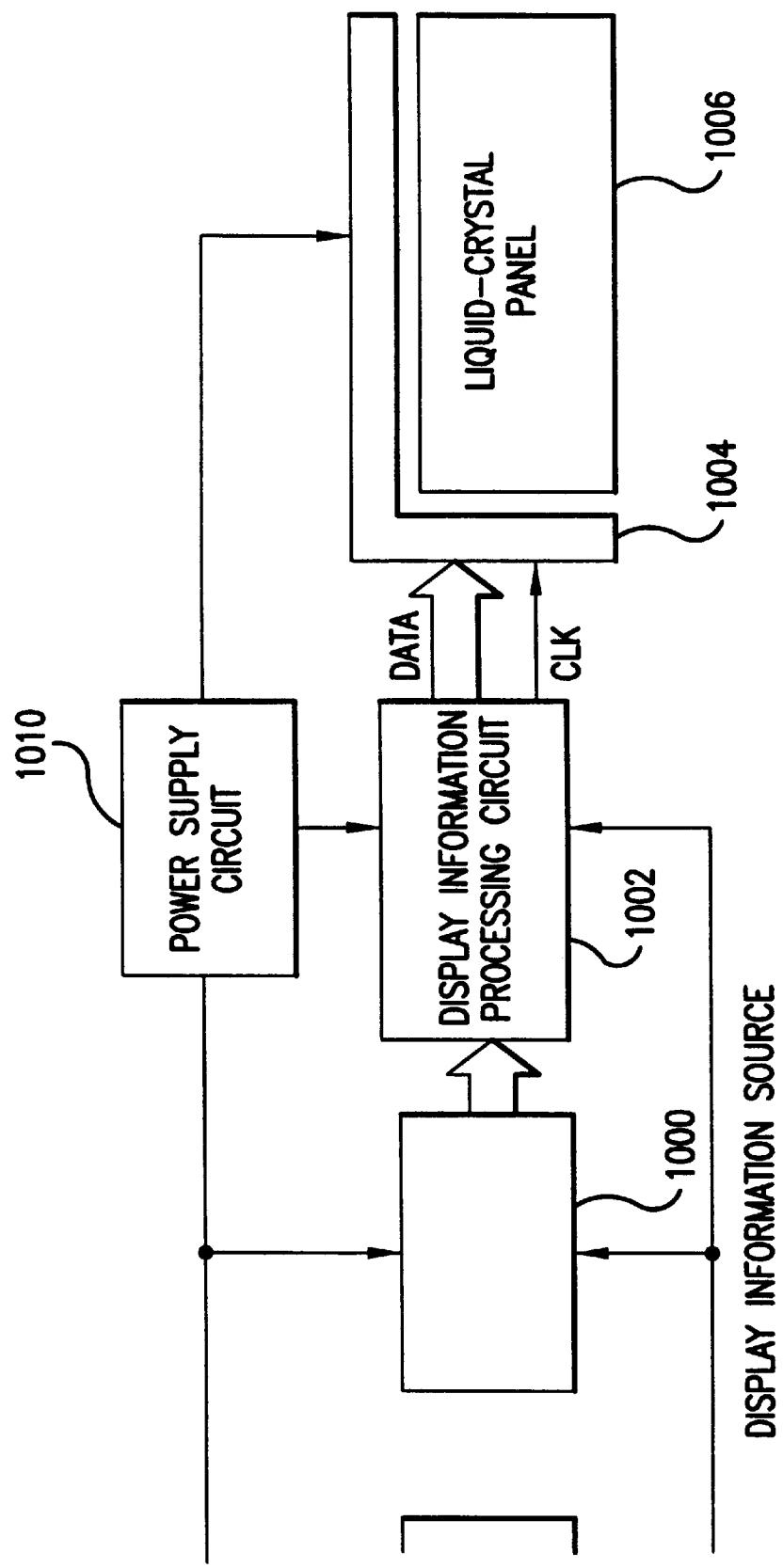
FIG. 18 is a block diagram of an electronic machine of this invention.

Referring to FIG. 18, an electronic machine incorporating the above-described liquid-crystal display apparatus includes a display information source 1000, a display information processing circuit 1002, a display driving circuit 1004, a liquid-crystal panel 1006, a clock generator circuit 1008, and a power supply circuit 1010. The display information source 1000 includes a memory such as a ROM or RAM, and a tuning circuit for tuning to and outputting a television signal, or display information such as a image signal, in synchronization with the clock signal from the clock generator circuit 1008. The display information processing circuit 1002 processes and outputs the display information, in synchronization with the clock signal from the clock generator circuit 1008. The display information processing circuit 1002 may include an amplifier/polarity reversal circuit, a phase expansion circuit, a rotation circuit, a gamma correction circuit, and a clamp circuit. The display driving circuit 1004 includes a scanning-driver IC and a data-driver IC, and drives the liquid-crystal panel 1006. The power supply circuit 1010 feeds power to each of the above circuits.

Figure 19:
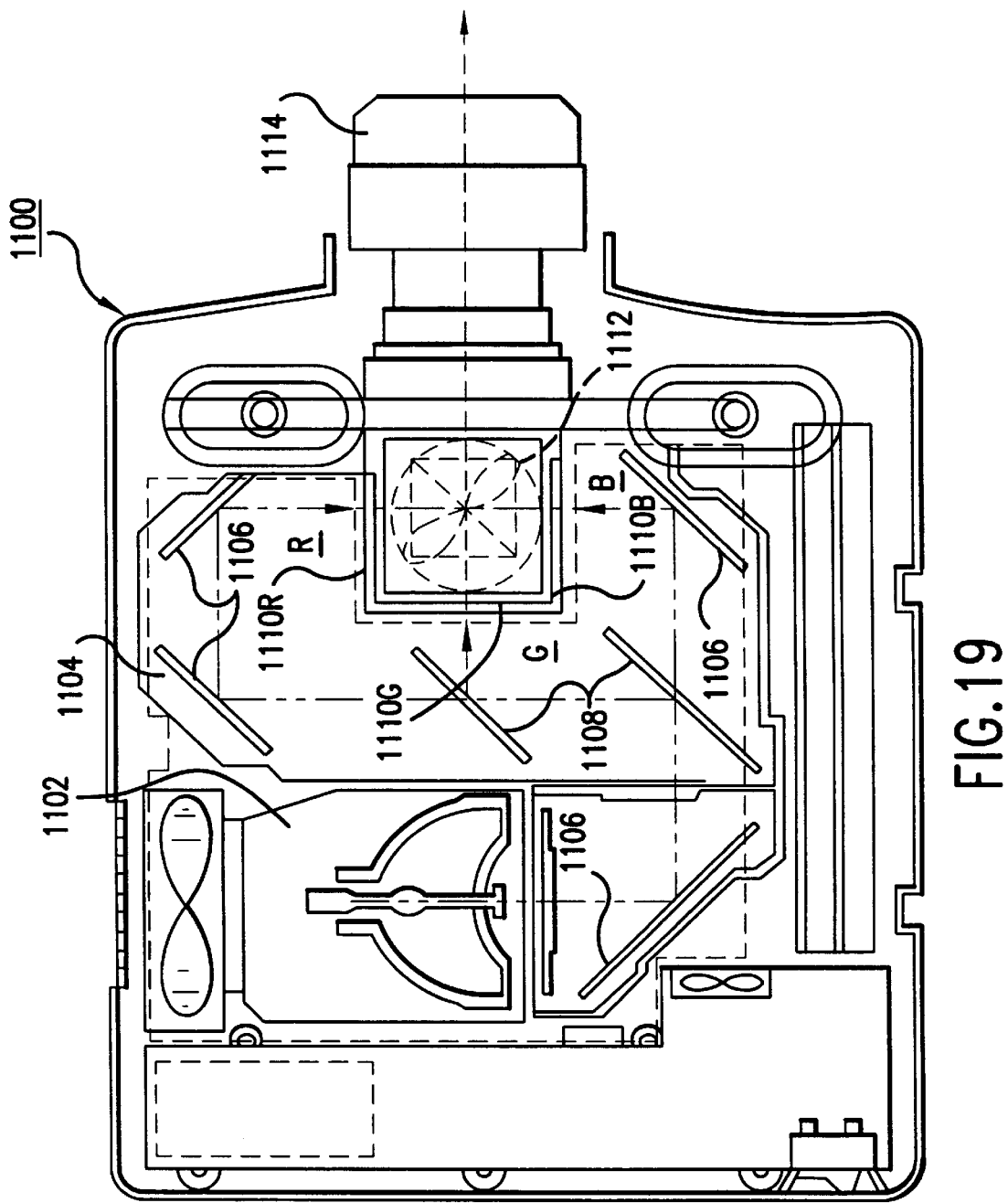
FIG. 19 is a diagram of a projector.
Figure 20:
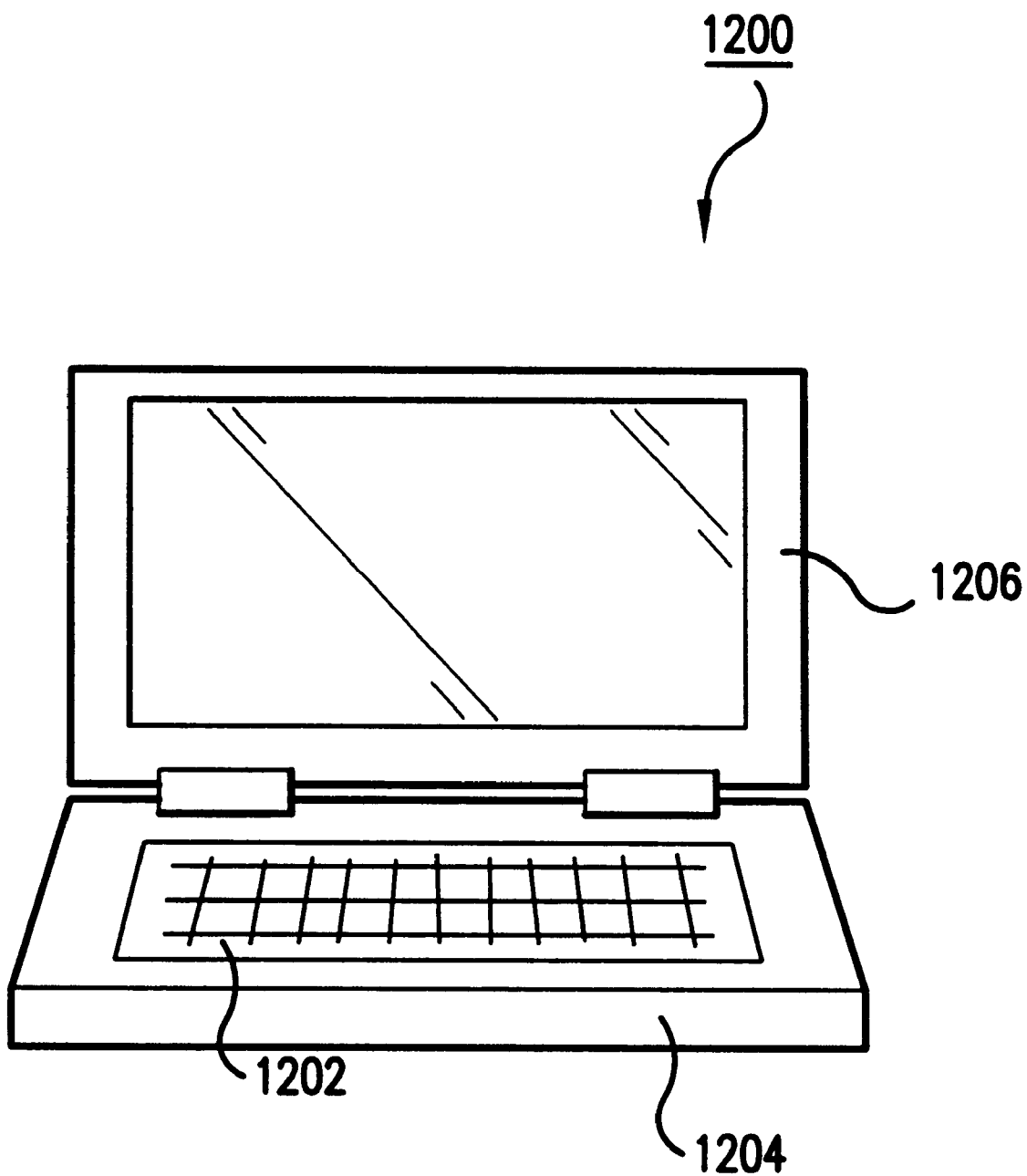
FIG. 20 is an external view of a personal computer.
Figure 21:
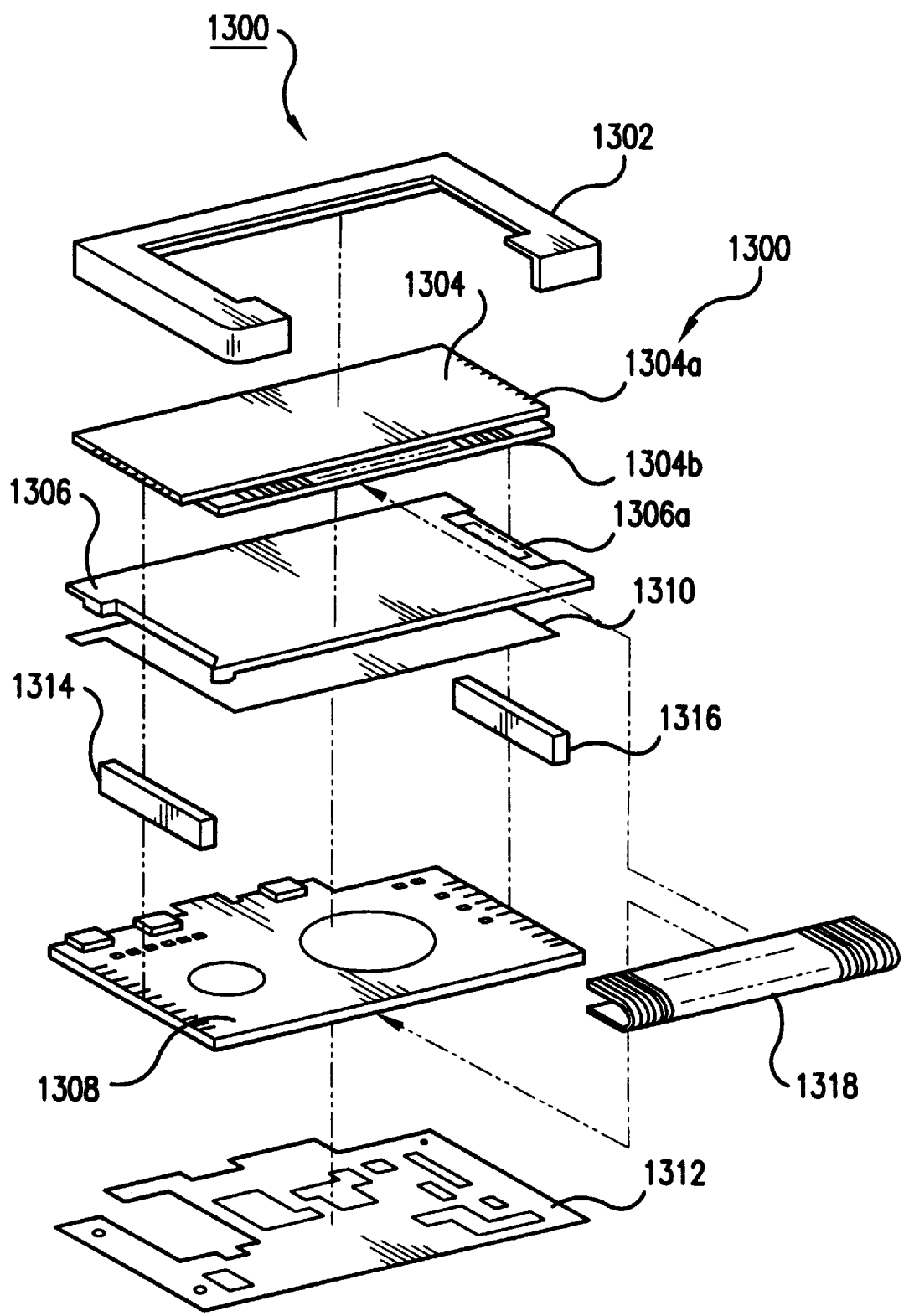
FIG. 21 is a perspective exploded view of a pager.

The typical electronic machines having the above construction may include a liquid-crystal projector shown in FIG. 19, a multi-media personal computer shown in FIG. 20, a pager shown in FIG. 21, portable telephones, wordprocessors, television sets, image tape recorders of viewfinder type or of direct monitor type, electronic pocketbooks, desktop calculators, a car navigation systems, POS terminals, engineering workstation and devices with a touch panel. The liquid-crystal projector shown in FIG. 19 includes a transmission type liquid-crystal panel as a light valve, and employs a three-plate prism type optical system.

Referring to FIG. 19, a projected light from a lamp unit 1102 as a white light source is split into the three primary colors R, G and B through a plurality of mirrors 1106, and two dichroic mirrors 1108 and then guided to three TFT liquid-crystal panels 1110R, 1110G and 1110B for presenting respective color images in a light guide 1104 in a projector 1100. Light rays modulated by the respective TFT liquid-crystal panels 1110R, 1110G, and 1110B are directed to a dichroic prism 1112 from three respective directions. The dichroic prism 1112 permits R and B light rays to be bent at a 90° and G light rays to travel straight, thereby combining these color images, and the combined image is then projected to a screen through a projection lens 1114.

Utilizing this invention in the color projector of FIG. 19, the clamp voltages for the three liquid-crystal panels 1110R, 1110G and 1110B are independently adjusted, and gamma correction is performed integrally with the clamp voltage adjustment. Thus, image quality adjustment is properly performed in accordance with the voltage-transmissivity curve of each liquid-crystal panel.

The personal computer 1200 shown in FIG. 20 includes main unit 1204 with a keyboard 1202, and a liquid-crystal display screen 1206.

The pager 1300 shown in FIG. 21 houses, within a metal frame 1302, a liquid-crystal display board 1304, a light guide 1306 with a back light 1306a, a circuit board 1308, first and second shield plates 1310 and 1312, two elastic conductive bodies 1314 and 1316, and a film carrier tape 1318. The two elastic conductive bodies 1314 and 1316 and film carrier tape 1318 connect the liquid-crystal display board 1304 to the circuit board 1308.

The liquid-crystal display board 1304 is constructed by sealing a liquid crystal between two transparent substrates 1304a and 1304b, thereby creating a dot matrix type liquid-crystal panel. The driving circuit 1004 in FIG. 18 may be utilized as one transparent substrate in addition to the display information processing circuit 1002. Furthermore, a circuit may be externally attached to the liquid-crystal display board 1304, and mounted on the circuit board 1308.

Figure 22:
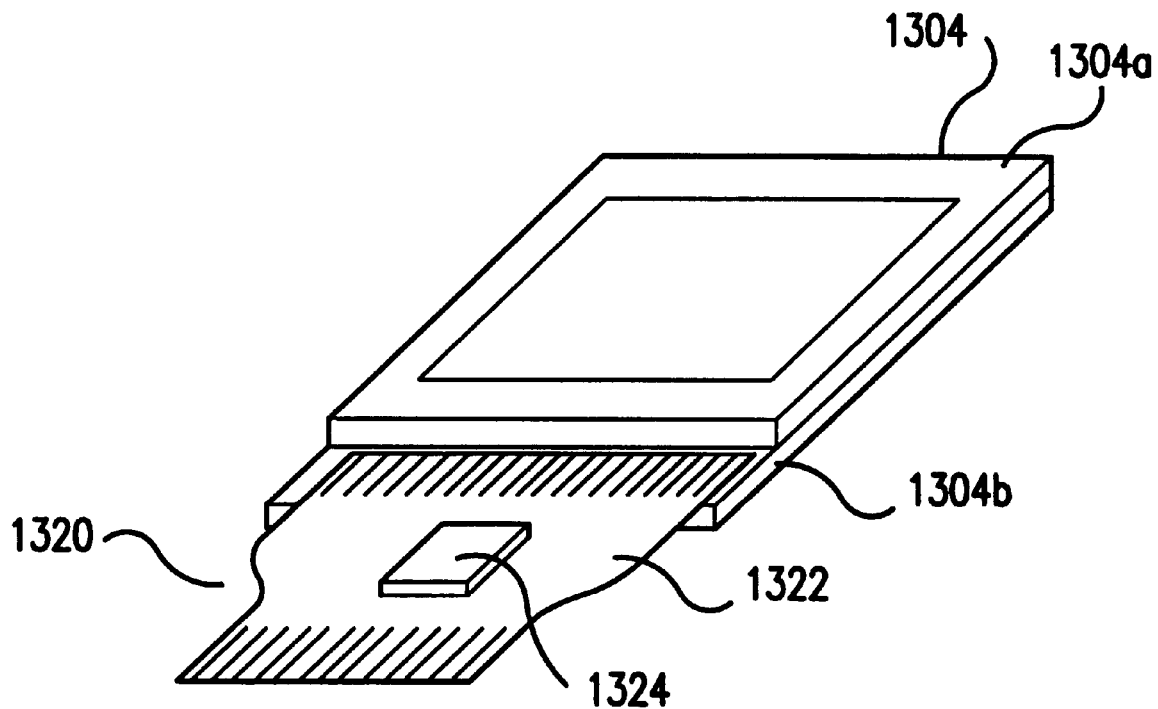
FIG. 22 is an explanatory view of a liquid-crystal display apparatus having an attached external circuit.

The machine shown in FIG. 21 is a pager which includes the circuit board 1308 and the liquid-crystal display board 1304. When the liquid-crystal display apparatus is used as a component in an electronic machine with a display driving circuit mounted on a transparent substrate, the liquid-crystal display board 1304 is considered a liquid-crystal display apparatus. Furthermore, the liquid-crystal display board 1304 may be secured to the metal frame 1302 and considered a component in the electronic machine. When a back light is employed, both the liquid-crystal display board 1304 and the light guide 1306 with the back light 1306a are assembled into the metal frame 1302 to build a liquid-crystal display apparatus. Alternatively, as shown in FIG. 22, a TCP (tape carrier package) 1320, in which an IC chip 1324 is mounted on a polyimide tape 1322 with a conductive metal film, is connected to one of the two transparent substrates 1304a or 1304b constituting the liquid-crystal display board 1304, and thus considered a liquid-crystal display apparatus for use in the electronic machine.

The present invention is not limited to the above embodiments, and various modifications and changes may be made within the scope of the present invention. For example, this invention may not only be utilized in liquid-crystal panels but also in apparatuses of electroluminescence cell and plasma display panel.

Furthermore, three or more amplification factors may be used in the gamma correction circuit of this invention. In this case, with reference voltages Vref1 and Vref2, the voltage difference of $V_{CLAMP}$–Vref1, and the voltage difference of $V_{CLAMP}$–Vref2 are fixed. If three resistors or more are connected in series in the voltage divider 62 in FIG. 3, two or more reference voltages are generated.

In the above embodiments, polarity reversal is carried out subsequent to clamp and gamma correction. This invention is not limited to this method. A positive polarity image signal may be processed through a positive clamp circuit and positive gamma correction circuit. A negative polarity image signal may be processed through a negative clamp circuit and negative gamma correction circuit. The voltage setting circuit may be connected to these positive and negative, clamp circuits and gamma correction circuits in the same manner as already described.

What is claimed is:

1. A clamp and gamma correction circuit comprising:
    a clamp circuit which receives an image signal varying between a first voltage and a second voltage and clamps one of the first and the second voltages to a predetermined clamp voltage while keeping constant an amplitude between the first and the second voltage;
    a gamma correction circuit which receives the output of the clamp circuit and amplifies the output of the clamp circuit at different amplification factors depending on whether the output of the clamp circuit exceeds at least one predetermined reference voltage; and
    a voltage setting circuit that sets the clamp voltage and the at least one predetermined reference voltage to the clamp circuit and the gamma correction circuit, respectively, while varying both the clamp voltage and the at least one predetermined reference voltage, a voltage difference between the clamp voltage and the at least one predetermined reference voltage is kept constant.

2. The clamp and gamma correction circuit according to claim 1, wherein said voltage setting circuit comprises:
    a variable voltage circuit;
    a constant voltage generator circuit which receives a varying input voltage and generates a constant voltage regardless of the value of the varying input voltage; and
    a voltage setting circuit that sets the clamp voltage and the at least one predetermined reference voltage to said clamp circuit and said gamma correction circuit, respectively, based on the output of said variable voltage circuit and the output of said constant voltage generator circuit.

3. The clamp and gamma correction circuit according to claim 2, wherein the variable voltage circuit comprises a transistor, the base of which is supplied with the input voltage, and the voltage between the base and the emitter of the transistor is the constant voltage.

4. The clamp and gamma correction circuit according to one of claim 2, wherein the voltage setting circuit comprises a voltage divider circuit that divides said constant voltage.

5. An image display apparatus comprising the clamp and gamma correction circuit according to claim 1 and a display device that provides an image based on an image signal that is processed through the clamp and gamma correction circuit.

6. The image display apparatus according to claim 5, wherein said image display device is a liquid-crystal panel that comprises a liquid crystal interposed between a pair of substrates.

7. An electronic machine comprising the image display apparatus according to claim 5.

8. An electronic machine comprising the clamp and gamma correction circuit according to claim 4.

9. An image display apparatus comprising the clamp and gamma correction circuit according to claim 2 and a display device that provides an image based on an image signal that is processed through the clamp and gamma correction circuit.

10. An image display apparatus comprising the clamp and gamma correction circuit according to claim 3 and a display device that provides an image based on an image signal that is processed through the clamp and gamma correction circuit.

11. An image display apparatus comprising the clamp and gamma correction circuit according to claim 4 and a display device that provides an image based on an image signal that is processed through the clamp and gamma correction circuit.

* * * * *